United States Patent [19]

Ratigalas

[11] Patent Number: 4,500,871
[45] Date of Patent: Feb. 19, 1985

[54] METHOD FOR CODING BINARY DATA AND A DEVICE DECODING CODED DATA

[75] Inventor: Max Ratigalas, Paris, France

[73] Assignee: Thomson-CSF, Paris, France

[21] Appl. No.: 482,886

[22] Filed: Apr. 7, 1983

Related U.S. Application Data

[63] Continuation of Ser. No. 192,940, Oct. 1, 1980, Pat. No. 4,394,641.

[30] Foreign Application Priority Data

Oct. 1, 1979 [FR] France ................. 79 24419

[51] Int. Cl.$^3$ ............................................ H03K 13/24
[52] U.S. Cl. ......................................... 340/347 DD
[58] Field of Search ............... 340/347 DD; 371/56, 371/55; 375/19; 360/39, 40, 48

[56] References Cited

U.S. PATENT DOCUMENTS

| | | | |
|---|---|---|---|
| 3,300,774 | 1/1967 | Chatelon | 340/347 DD |
| 3,537,100 | 10/1970 | Barjot | 375/19 |
| 3,631,471 | 12/1971 | Griffiths | 340/347 DD |
| 3,653,036 | 3/1972 | Whiting | 340/347 DD |
| 4,072,987 | 2/1978 | Walker | 360/48 |
| 4,146,909 | 3/1979 | Beckenhauer | 360/39 |
| 4,216,460 | 8/1980 | Baldwin | 340/347 DD |
| 4,261,019 | 4/1981 | McClelland | 360/40 |

FOREIGN PATENT DOCUMENTS 7721061  10/1978  France .

OTHER PUBLICATIONS

Lavenberg, "IBM Technical Disclosure Bulletin", vol. 13, No. 4, Sep. 1970, pp. 1001–1002.
Caflisch, "Nachrichtentechnische Zeitschrift", vol. 27, No. 6, Jun. 1974, pp. 219–224.
Jacoby, "IEEE Transactions on Magnetics", vol. Mag-15, No. 3, Jul. 1979, pp. 1124–1130.
Greenstein, "The Bell System Technical Journal", vol. 53, No. 6, Jul.-Aug. 1974.
Beckenhauer, "IBM Technical Disclosure Bulletin", vol. 21, No. 1, Jun. 1978, pp. 326–327.
Miessler, "IBM Technical Disclosure Bulletin", vol. 17, No. 5, Oct. 1974, pp. 1489–1491.

Primary Examiner—C. D. Miller
Attorney, Agent, or Firm—Cushman, Darby, Cushman

[57] ABSTRACT

A method for coding binary data to be transmitted and a device for decoding coded data dispense with the need to transmit a direct-current component and make it possible to reconstitute clock signals from coded data without any addition of a particular channel. With this objective, the input signal constituted by a sequence of groups of eight binary data is converted to a coded signal constituted by a sequence of words of sixteen binary data associated respectively with the groups and having a data repetition frequency which is double the repetition frequency of the input signal data. The words are also chosen so as to ensure that each datum of the coded signal is followed or preceded by a datum having the same logic state. Furthermore, a sequence of particular words is inserted at the beginning of the message in order to permit easy recovery of clock signals at the time of decoding.

2 Claims, 5 Drawing Figures

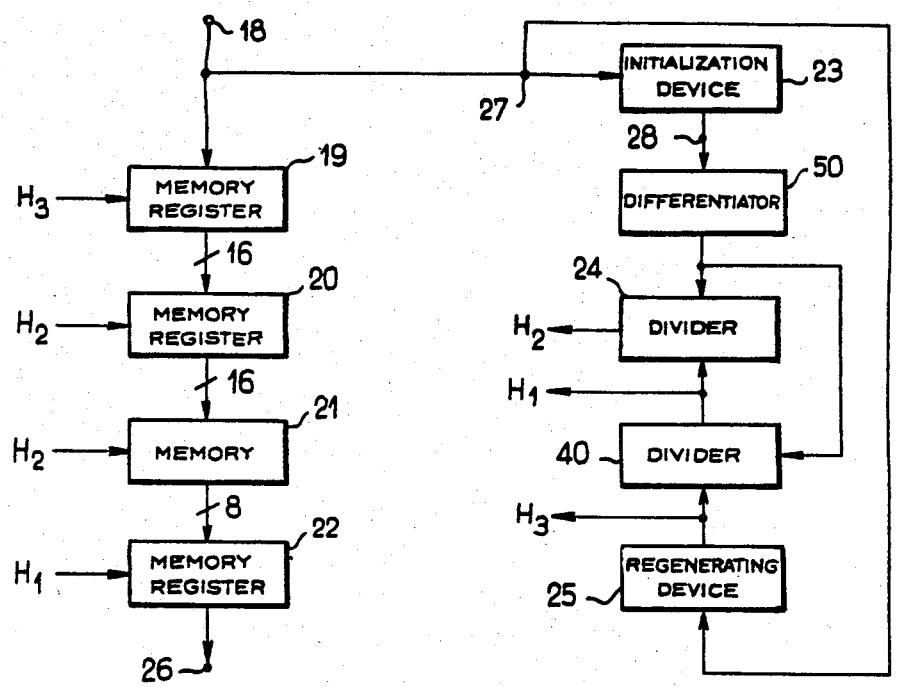
FIG_2
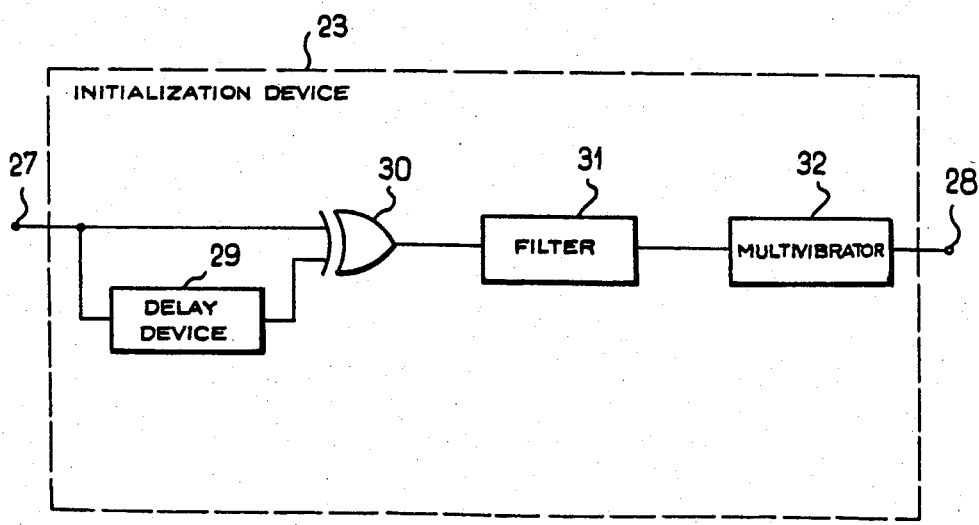
FIG_3

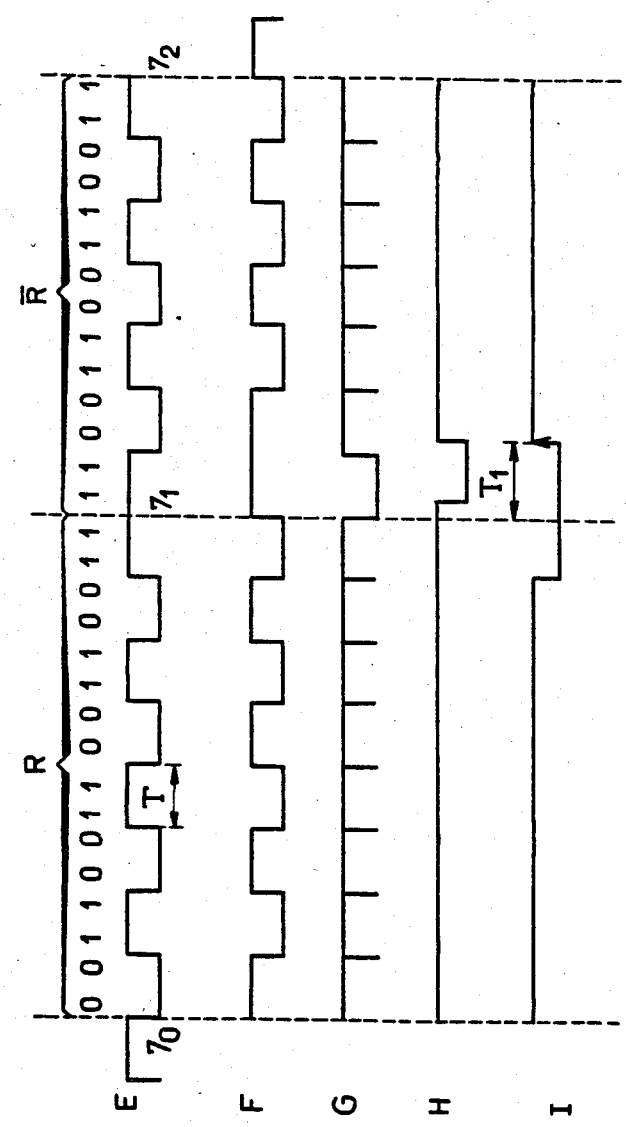
FIG_4a

| C | D | A | B | $u$ |
|---|---|---|---|---|
| 0 | 0 | 0 | 0 | 1 |
| 0 | 0 | 0 | 1 | 0 |
| 0 | 0 | 1 | 0 | 1 |
| 0 | 0 | 1 | 1 | 0 |
| 0 | 1 | 0 | 0 | 1 |
| 0 | 1 | 0 | 1 | 1 |
| 0 | 1 | 1 | 0 | 0 |
| 0 | 1 | 1 | 1 | 0 |
| 1 | 0 | 0 | 0 | 0 |
| 1 | 0 | 0 | 1 | 0 |
| 1 | 0 | 1 | 0 | 1 |
| 1 | 0 | 1 | 0 | 1 |
| 1 | 1 | 0 | 0 | 0 |
| 1 | 1 | 0 | 1 | 1 |
| 1 | 1 | 1 | 0 | 0 |
| 1 | 1 | 1 | 1 | 1 |

FIG. 4b

METHOD FOR CODING BINARY DATA AND A DEVICE DECODING CODED DATA

This is a continuation, of application Ser. No. 192,940 filed Oct. 1, 1980, now issued as U.S. Pat. No. 4,394,641.

This invention relates to methods of coding of binary data, to coding devices and decoding devices employed in systems for transmission of binary data over a channel, especially in any system having a channel which does not transmit direct-current components and low frequencies such as a video tape recorder.

In transmission systems of this type, it is necessary to translate the items of information to be transmitted using code which is adapted to the inherent characteristics of the channels, especially to their passband.

Furthermore, in order to be optimal, a method of coding must have the following properties:

regeneration of a clock signal without addition of a particular channel;

ready detection of errors;

compression of the coded signal passband in order to transmit the coded information while ensuring error-free restitution of the binary signal;

removal of any need to transmit the direct-current component, for example in order to permit the use of transformer couplings as well as alternating-current coupling amplifiers.

A number of types of coding are known at the present time but no single method possesses the properties mentioned above. Thus the NRZ code (non-return-to-zero code) gives rise to problems of suppression of the direct-current component and of clock-pulse recovery. The group codes increase the useful passband. The Miller code and its derivatives do not permit either ready error detection or the introduction of particular code words in order to synchronize the clock signals at the time of decoding.

The present invention is directed to a method of coding which has the optimum properties defined in the foregoing.

According to the invention, there is provided a method for coding an input signal constituted by a sequence of groups $G_i$ (where i can vary from 1 to $2^n$, n being a positive whole number) of n binary data having a repetition frequency F. Said method consists in associating with each group one pair of binary words ($A_i$, $\overline{A}_i$), where $\overline{A}_i$ is the complement word of $A_i$, in which each word is defined by 2n bits having a repetition frequency 2F and only the end bits of said words, namely the bit having the lowest weight and the bit having the highest weight, can be "isolated". The method also consists in forming a coded signal by replacing the n bits of a given group $G_p$ (where p is between 1 and $2^n$), in the case of each group of bits of the input signal, by the 2n bits of one of the words of the pair ($A_p$, $\overline{A}_p$) which is associated in such a manner as to ensure that the bit of lowest weight of the word selected is "surrounded" and that the bit of highest weight of the binary word associated with the preceding group $G_p$ in the input signal is "surrounded".

These and other features of the invention will be more apparent upon consideration of the following description and accompanying drawings, wherein:

FIG. 2 shows a decoding device in accordance with the invention;

FIG. 3 is a detailed diagram of a device of FIG. 2;

FIG. 4a is a signal waveform diagram which will serve to explain the operation of the coding and decoding devices;

FIG. 4b is a table of correspondence which will also serve to explain the operation of the coding and decoding devices.

Figure 1:
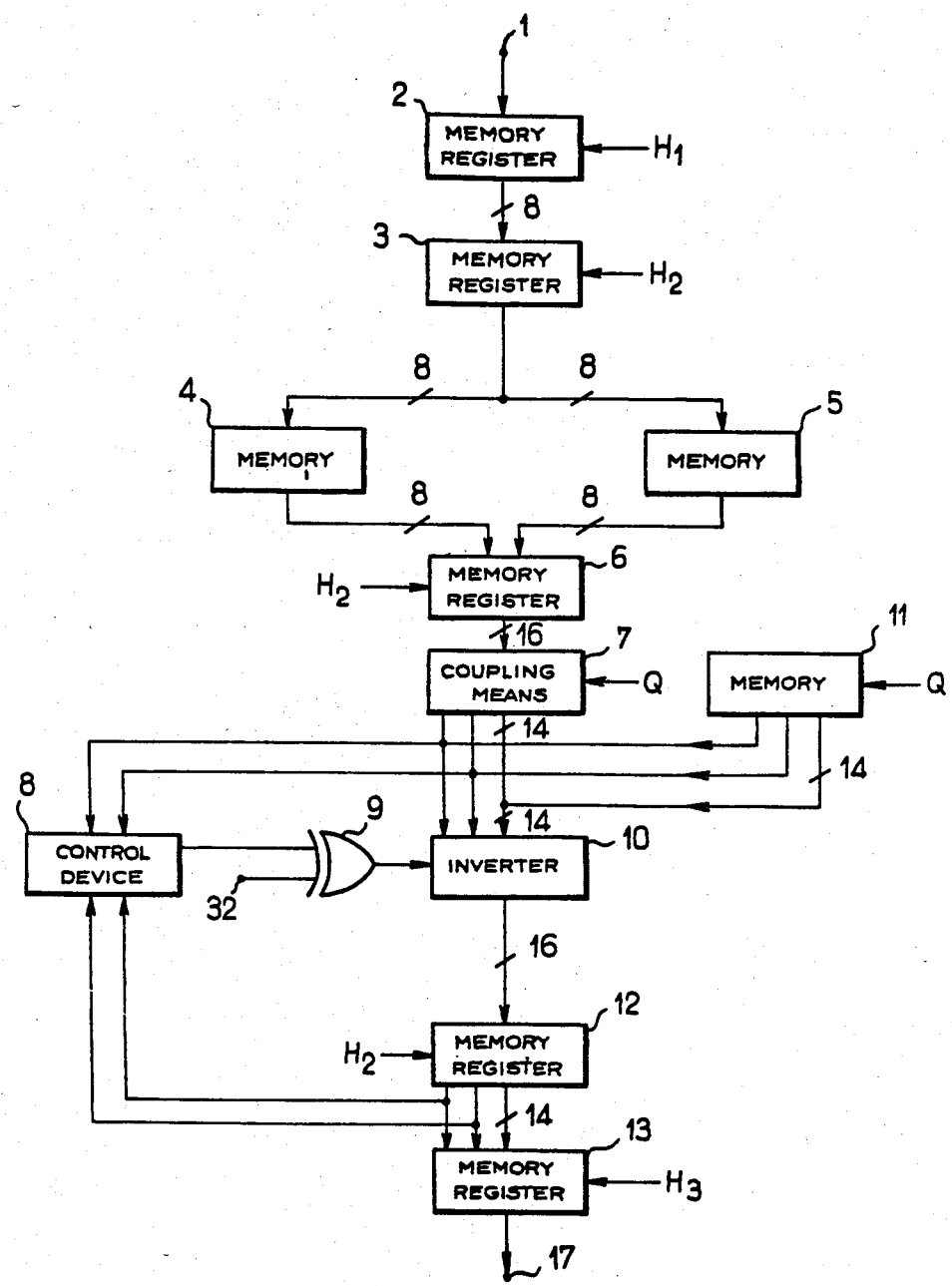
FIG. 1 shows a coding device in accordance with the invention.

In FIGS. 1 and 2, a single connection is represented by a thin line and a multiple connection is represented by a thin line intersected by a short, slanting line segment with an adjacent numeral which indicates the number of single connections constituting said multiple connection.

It should be noted in addition that only the clock signals and the synchronization devices which serve to gain an understanding of the invention have been shown in the drawings for the sake of enhanced clarity and simplification of the description.

In FIG. 1, an input terminal is connected to the input of a parallel-read series-write memory register 2. The eight outputs of said register 2 are coupled respectively through a parallel-read/write register 3 to the eight inputs of a dead memory 4 and to the eight inputs of a dead memory 5. The eight outputs of each of these two memories 4 and 5 are coupled respectively to the first eight and to the last eight inputs of the sixteen inputs of coupling means 7 through a parallel-read/write register 6. A first and a second output of said coupling means 7 are coupled respectively to a first input and to a second input of a control device 8. All sixteen outputs of coupling means 7 are connected to sixteen corresponding inputs of an inverter 10. A dead memory 11, also having sixteen outputs, has the first and second outputs coupled respectively to the first and second inputs of control device 8. All sixteen outputs of dead memory 11 are connected to the sixteen inputs of the inverter 10. The sixteen outputs of the inverter 10 are connected respectively to the sixteen inputs of a parallel-read/write register 12. A first output and a second output of said register 12 are connected respectively to a third input and to a fourth input of the control device 8 as well as to a first input and to a second input of a series-read parallel-write register 13. Fourteen additional outputs of said register 12 are connected respectively to fourteen additional inputs of the register 13. The output of the register 13 is connected to an output terminal 17.

The output of the control device 8 is connected to a first input of an exclusive-OR gate 9, a second input of which is connected to a terminal 32. The output of said exclusive-OR gate 9 is connected to a control input of the inverter 10.

Each register 2, 3, 6, 12 and 13 is additionally provided with a clock input. The clock input of the register 2 receives a clock signal $H_1$ at the frequency F. The register 13 receives at its clock input a signal $H_3$ at the frequency 2F. Finally, the registers 3, 6 and 12 receive at their clock inputs the clock signal $H_2$ at the frequency $F(/8)$. The clock signals $H_1$, $H_2$ and $H_3$ are in phase. The coupling means 7 and the memory 11 are provided in addition with a control input for receiving a signal Q. The terminal 32 receives a signal Y.

The memories 4 and 5 employed in our form of construction are 2K-bit PROM memories (programmable read-only memories).

The device described in the foregoing makes it possible to code $2^8$ different states, each of these $2^8$ states being designated by a group of eight bits having a total time-duration 8T; each bit has a time-duration T (equal to (1/F) and is capable of assuming either the state "1" or the state "0".

Starting from an input signal constituted by a sequence of 8-bit groups in which each group corresponds to one state to be coded, the device generates on the output terminal 17 a coded signal constituted by a sequence of 16-bit binary words; each bit has a time-duration T/2 and each word corresponds to one 8-bit group of the input signal and therefore to one state to be coded. The coded signal obtained has many advantageous properties, namely a narrow frequency band (substantially) equivalent to the frequency band which is necessary for the NRZ code) in which, in addition, there is no direct-current component, regeneration of a clock signal which is useful for decoding without addition of a channel other than the channel which serves to transmit the coded signal, and ready detection of errors.

The method carried out by this coding device is as follows:

Among the possible $2^{16}$ sixteen-bit words to be associated with a state to be coded, let us consider only those binary words which satisfy the following conditions:

among the sixteen bits which form one word, eight bits are in state "1" and eight bits are in state "0" in order to prevent transmission of a coded signal having a frequency spectrum containing a direct-current component;

furthermore, apart from the bits located at the ends of the word, there cannot exist a bit in the state "X" (X can assume either the value "1" or the value "0") which is not either followed or preceded by a bit having the state "X".

In the remainder of the description and in the appended claims, a bit which fails to satisfy the condition last mentioned will be designated as an "isolated" bit. A bit which is not "isolated" will be designated as a "surrounded" bit.

The number of binary words which satisfy these two conditions is 592 or, for example, 296 words $A_j$ (j varies from 1 to 296) beginning solely with a bit in state "0" and 296 complement words $\overline{A_j}$ beginning solely with a bit in state "1".

If one binary word having a time-duration 8T taken from the 296 words $A_j$ is associated with each state to be coded, the end bit of a word may be "isolated". In fact, since the coded signal consists of a sequence of 16-bit words associated with each of the states to be coded, it must accordingly be ensured that the serial association of words is not conducive to the appearance of "isolated" bits. Let us consider a word $A_p$ associated with a state p and having an end bit b of lowest weight which is "isolated". In the case in which the previously coded state is associated with a word whose last bit having the highest weight is not in the same state as the bit b, said bit b will remain "isolated" in the coded signal.

In order to avoid such a representation, the complement word $\overline{A_p}$ is associated with the state p and not the word $A_p$, with the result that the bit b which has become $\bar{b}$ will not be isolated.

The method of coding in accordance with the invention therefore consists in replacing in the input signal each of the eight-bit groups corresponding to the states to be coded, either by one of the j words consisting of sixteen bits $A_j$ or by one of the j complement words $\overline{A_j}$ as a function of the last bit of the previously associated word (bit having the highest weight).

Furthermore, since the number of possible pairs ($A_j$, $\overline{A_j}$) is higher than the number of states to be coded (296 pairs in respect of 256 states), it is preferable to eliminate the pairs of which the number of consecutive bits in state "0" or of consecutive bits in state "1" is the highest. Thus the coded-signal spectrum will contain less low frequencies and regeneration of a clock signal will be facilitated by a maximum number of transitions. It is also useful to eliminate certain words which can be employed for recognition of characteristic instants.

In our example of construction, the coded signal obtained is constituted by a sequence of bits such that the minimum time interval between two transitions is T (as in the NRZ code) whilst the maximum time interval is 3T.

The operation of the device for carrying out the method of coding hereinabove described is as follows:

The input signal applied to the terminal 1 is constituted by a sequence of 8-bit groups at the frequency F (equal to 1/T). The frequency of the groups is F/8 and each of these groups corresponds to a state to be coded.

The memory registers 2 and 3 serve to deliver in parallel the eight bits of each group which forms the input signal.

The memory register 2 writes the bits of the input signal in series according to the frequency F of the clock signal $H_1$. The memory register 3 writes in parallel the bits read on the eight outputs of the register 2 and delivers these bits in parallel on its eight outputs according to the frequency F/8 of the clock signal $H_2$. The dead memories 4 and 5 each have eight address inputs. There are stored in each memory $2^8$ words consisting of eight bits such that the $2^8$ sixteen-bit words constituted by the association of the two 8-bits words designated by the same address within the memories 4 and 5 correspond to words selected from the 296 words $A_j$ described earlier.

Thus, for each combination of eight bits received by the address inputs of the memories 4 and 5, there is delivered by said memories a 16-bit word which does not contain any "isolated" bits except for the end bits of said word. The register 6 serves to store these 16-bit words and to restitute them at the frequency F/8.

The signal Q is at the logic level 1 during a time interval equal to 24T before the input signal is received at the input terminal 1. During this time interval, the coupling means 7 are activated so as to interrupt the line at the output of the register 6. The signal Y which is present on the terminal 32 is at the logic level "1" only during the time interval 8T which precedes a return to the logic state "0" of the signal Q. Interruption of the line is produced by the signal Q in order to permit insertion of a message constituted by three particular consecutive words at the beginning of the coded signal. This message is necessary for regeneration of a clock signal synchronization pulse at the time of decoding.

When the signal Q is in the logic state "0", the sixteen bits delivered by the register 6 are stored by the memory register 12 after passing through the inverter 10. The signal Y is then in state "0", with the result that the inverter 10 is activated only when the control device 8 delivers a signal having a logic level u equal to "1".

The memory register 13 stores the bits which are present at the output of the register 12. These bits are then read in series within the register 13 at the frequency 2F of the clock signal $H_3$ and delivered on the output terminal 17.

At any predetermined instant, the control device 8 receives the last two bits A and B of highest weight of the word $B_a$ delivered by the register 12 and the first two bits C and D of lowest weight of the word $B_b$ delivered by the register 6 at the same instant.

According to the logic states of said four bits A, B, C and D, it is easy to deduce therefrom that the bit B or the bit C is "isolated", in which case the control device 8 produces an inversion of the bits of the word $B_b$. Furthermore, the word $B_b$ is inverted when the bits A, B, C and D are in the same state in order to avoid an excessively long series of bits having the same state.

The table of FIG. 4b gives the logic state u of the output of the device 8 in all possible cases of combinations of states of the bits A, B, C and D.

When the signal Q is in the logic state "1", the coupling means are controlled so as to interrupt the line at the output of the register 6 during a time interval equal to 24T. The same signal Q initiates reading of the contents of the memory 11 in which are stored the bits corresponding to a particular word R. It is in fact necessary at the beginning of the coded signal to generate a message constituted either by the particular word R followed by R and then by its complement $\overline{R}$ or by the word $\overline{R}$ followed by $\overline{R}$ and then by R in order to permit regeneration of a synchronizing pulse at the time of decoding as will hereinafter be explained.

The signal E of FIG. 4a represents the logic state of the particular word R followed by the word $\overline{R}$.

Let t' be the instant at which the logic level of the signal Q changes from state "0" to state "1", let $t_o$ be the instant T'+8T, let $t_1$ be the instant t'+16T and let $t_2$ be the instant t'+24T.

Between the instants t' and $t_1$, which corresponds to the logic state "1" of the signal Q and to the state "0" of the signal Y, there is generated at the output of the inverter 10 either the word R followed by R or the word $\overline{R}$ followed by $\overline{R}$, depending on the bits of highest weight of the word which is present at the output of the register 12. Between the instants $t_1$ and $t_2$, the word present at the input of the inverter 10 is R, the word present at the output of the register 12 is either R or $\overline{R}$. In the case in which R is at the output of said register 12, the output signal of the gate 9 produces an inversion of the bits by the inverter 10 (the terminal 32 is in the logic state "1" and the output of the control device is in state "0").

In the case in which the word R is at the output of the register 12, the inverter is not activated (the terminal 32 and the output of the control device are in state "1").

During the period corresponding to the logic state "1" of the signal Q, there are thus obtained on the output terminal 17 either the three consecutive words R followed by R then by $\overline{R}$, or $\overline{R}$ followed by $\overline{R}$ then by R.

FIG. 2 shows a preferred embodiment of a device for decoding a coded signal in accordance with the method described in the foregoing.

In this figure, an input terminal 18 which is intended to receive a coded signal is connected to a series-write, parallel-read memory register 19, to an initialization device 23, to a device 25 for regenerating the clock signal $H_3$ at the frequency 2F. The output of said device 25 is coupled to the input of a divider 40 whose output delivers the clock signal $H_1$ at the frequency F. The output of the divider 40 is connected to the input of a divider 24 whose output delivers the clock signal $H_2$ at the frequency (F/b 8).

The dividers 40 and 24 are provided in addition with an initialization input connected to the output of the initialization device 23 via a differentiator 50. The sixteen outputs of the memory register 19 are coupled to the sixteen inputs of a dead memory 21 via a parallel-read/write memory register 20. The eight outputs of said memory 21 are connected to the eight inputs of a series-read, parallel-write memory register 22. The output of said register 22 is connected to an output terminal 26.

The operation of said decoding device is as follows:

The coded signal received on the input terminal 18 is constituted by a sequence of 16-bit words at the frequency 2F. The word frequency is F/8 and each word corresponds to a coded state in accordance with the invention.

The memory registers 19 and 20 serve to deliver in parallel the sixteen bits of each word which forms the coded signal. The memory register 19 writes the bits of the coded signal in series at the frequency 2F of the clock signal $H_3$. The memory register 20 writes in parallel the bits read on the sixteen outputs of the register 19 and delivers said bits in parallel to said sixteen outputs at the frequency (F/8) of the clock signal $H_2$.

The dead memory 21 has sixteen address inputs. There are stored in this memory the 8-bit words corresponding to each of the 16-bit words of the coded signal. For each combination of sixteen bits received by the address inputs of said memory 21, the register 22 thus stores the group of eight bits which are present on the eight outputs of the memory 21. Said register 22 restitutes these bits in series on the terminal 26 at the frequency F of the clock signal $H_1$.

The device 25 easily reconstitutes the clock signal $H_3$ having a frequency 2F from the particular words R or $\overline{R}$ received at the beginning of the coded signal. Said device then permits control of said signal $H_3$ in dependence on the transitions of the coded signal which are spaced at a time interval K/2T (where k is a positive whole number). The divider 40 and the divider 24 make it possible respectively to obtain the clock signal $H_1$ at the frequency F and the clock signal at the frequency F/8. In order to ensure that said clock signals $H_1$, $H_2$ and $H_3$ are in phase, the device 23 generates an initialization pulse in order to initialize the dividers 40 and 24 by means of the message constituted by the word $\overline{R}$ followed by R then by $\overline{R}$ or else by the word $\overline{R}$ followed by $\overline{R}$ and then by R.

The schematic diagram of FIG. 3 shows one example of construction of the device 23.

In this figure, an input terminal 27 corresponding to the input of the device 23 is connected to a first input of an exlusive-OR gate 30 and to a second input of said gate via a delay device 29. The output of said exclusive-OR gate 30 is connected to the input of a filter 31. The output of said filter 31 is coupled to an output terminal 28 via a multivibrator 32.

The operation of this device will be more readily understood by referring to the voltage-time diagrams in FIG. 4a.

There are shown in this figure the signals E, F, G, H and I which are present respectively between the instants $t_o$ and $t_2$ on the input terminal 18 of the decoder, at the output of the delay device 29, at the output of the exclusive-OR gate 30, at the output of the filter 31 and at the output of the multivibrator 32. The instant denoted $t_2$ is the instant at which the coded signal is received; the instant denoted $t_o$ corresponds to the instant $t' + 8T$, where $t'$ is the instant at which the message constituted by the particular word R followed by R and then by $\overline{R}$ or by the word $\overline{R}$ followed by $\overline{R}$ and then by R is received.

Let us consider that the device 23 receives before the beginning of the coded signal a message constituted by the word R followed by R then by $\overline{R}$. The signal E of FIG. 4a represents the end of said message constituted by the word $\overline{R}$ followed between the instants $t_o$ and $t_2$.

The gate 30 performs an exclusive-OR function between the signal E and the signal F representing the signal E which is delayed by a time interval T ($T = 1/F$), this time-delay being obtained by means of the delay device 29. The signal G which results from this correlation is filtered by the filter 31 in order to eliminate spurious pulses. Said filter 31 delivers the signal H. Transition of said signal H from state "0" to state "1" has the effect of triggering the multivibrator 32. Thus the output signal I of said multivibrator 32 changes from the logic state "0" to the state "1" at the instant $t_1 + T_1$ and is maintained in this state throughout the duration of the coded signal by the numerous transitions of the signal H from state "0" to state "1". In fact, all the words of the coded signal other than the word R give rise to at least one transition of the signal H from state "0" to state "1". Thus the multivibrator 32 will be maintained in state "1" throughout the duration of the coded signal. The time interval during which the multivibrator 32 is maintained in state "1" without transition from state "0" to state "1" on its input is 15T. Between the instants $t'$ and $t_1$, the output state of the multivibrator 32 consequently changes to state "0" prior to occurrence of the transition which is characteristic of the instant $t_1 + T_1$.

Since the time interval $T_1$ is a constant which is characteristic of the filter 31 and of the multivibrator 32, the leading edge of the signal I which rises at the instant $t_1 + T_1$ permits initialization of the dividers 40 and 24 after differentiation by the differentiator 50. The clock signals $H_2$ and $H_1$ are thus in phase with the clock signal $H_3$.

The invention is not limited to the embodiments hereinabove described with reference to the accompanying drawings. In particular, it is within the capacity of those versed in the art to construct a coding device and a decoding device either by means of circuits of the TTL type (transistor-transistor logic) or by means of circuits of the ECL type (emitter-coupled logic), depending on the operating frequency of the elements of these devices.

The memory 21 employed by the decoding device described with reference to FIG. 2 can consist either of eight 64K-bit PROM memories (programmable read-only memories) or of six FPLA memories (field-programmable logic array memories). In the last-mentioned case, an inverter is inserted between the memory register 20 and the six FPLA memories. This inverter is controlled by the highest-weight bit of the word which is present at the output of the register 20, with the result that it delivers words beginning solely with one bit in state "0" (or in state "1").

So far as the coding device is concerned, it is also within the capacity of anyone versed in the art to replace the memory 11, the coupling means 7 and the exclusive-OR gate 9 by elements which serve to generate a particular message in order to recover the synchronizing pulse.

The method of coding in accordance with the invention has been described with specific reference to an input signal consisting of 8-bit groups but a similar method can be applied to an input signal consisting of groups in which the number of bits can have any desired value n (where n is a positive whole number).

However, it is possible to code all the $2^n$ states only when n is equal to eight or when n is higher than eight.

On the other hand, if the conditions of utilization of the coded signal permit the presence of a direct-current component in its frequency spectrum, it is possible to reduce the bit rate of said signal by employing 16-bit words constituted by $\beta$ bits in state "0" and by m bits in state "1" (where $\beta$ and m are positive whole numbers with $m + \beta = n$).

What is claimed is:
1. A method for preparing an input signal for transmission, said input signal having a sequence of groups selected from a set of all possible groups, each of said groups having n binary digits having a repetition frequency F, said method comprising the steps of:
generating for each of said groups in said set a unique binary word each of said words being defined by n bits having a "0" state and n bits having a "1" state and having a repetition frequency 2F, each of the bits of said words being adjacent to a bit having the same state except end bits of said words which can be adjacent a bit in said word of opposite state;
generating the complement of at least some of said words; and
forming a transmission signal by replacing the n bits of each of said groups in said input signal with the 2n bits of one of the word and the complement of the word uniquely corresponding to said group which ensures that both the last bit of the word previously generated and the first bit of the word presently generated are adjacent bits of the same state when both said previously generated word and said presently generated word are considered together.

2. A method according to claim 1 further comprising the step of generating a synchronization message at the beginning of the transmission signal in order to permit recovery of the clock signals when the transmission signal is received, said messsage having a sequence of binary words R followed by the word $\overline{R}$, $\overline{R}$ being the complement word of R and R having a sequence of p groups of $q = (2n/p)$ bits, p and q being positive whole numbers, at a repetition frequency of 2F, all of the bits of a group having the same state and being followed by a group of bits having an opposite state.

* * * * *

UNITED STATES PATENT AND TRADEMARK OFFICE
CERTIFICATE OF CORRECTION

PATENT NO.  : 4,500,871
DATED       : February 19, 1985
INVENTOR(S) : Max Artigalas It is certified that error appears in the above-identified patent and that said Letters Patent is hereby corrected as shown below:

On the title page Item [75] should read:

Inventor name is ARTIGALAS, Max.

Signed and Sealed this

Fifth Day of November 1985

[SEAL]

Attest:

Attesting Officer

DONALD J. QUIGG

Commissioner of Patents and Trademarks